United States Patent [19]

Daniel et al.

[11] Patent Number: 5,224,161
[45] Date of Patent: Jun. 29, 1993

[54] METHOD OF SCRAMBLING AND OF UNSCRAMBLING COMPOSITE VIDEO SIGNALS, AND DEVICE FOR IMPLEMENTATION

[75] Inventors: Patrick Daniel, Strasbourg; Jean-Claude Guillon, Gerstheim, France; Francis Renard, Ostwald, all of France

[73] Assignee: Laboratoir Europeen de Recherches Electroniques Avancees, Societe en Nom Collectif, Courbevoie, France

[21] Appl. No.: 720,517

[22] PCT Filed: Nov. 8, 1989

[86] PCT No.: PCT/FR89/00579
§ 371 Date: Jul. 8, 1991
§ 102(e) Date: Jul. 8, 1991

[87] PCT Pub. No.: WO91/07849
PCT Pub. Date: May 30, 1991

[30] Foreign Application Priority Data
May 6, 1988 [FR] France .................... 88 06121

[51] Int. Cl.$^5$ ............................................. H04N 7/167
[52] U.S. Cl. .......................................... 380/14; 380/11; 380/20
[58] Field of Search ............... 380/14, 16, 17, 11, 380/20

[56] References Cited

U.S. PATENT DOCUMENTS

| 4,081,832 | 3/1978 | Sherman | 380/20 X |
| 4,292,650 | 9/1981 | Hendrickson | . |
| 4,388,643 | 6/1983 | Aminetzah | 380/20 X |
| 4,484,027 | 11/1984 | Lee et al. | 380/20 X |
| 4,611,242 | 9/1986 | Williams | 380/14 |
| 4,751,428 | 6/1988 | Kamitake | 380/20 |
| 4,947,428 | 8/1990 | Guillou et al. | 380/20 |

FOREIGN PATENT DOCUMENTS

| 0127381 | 12/1984 | European Pat. Off. . |
| 2320676 | 3/1977 | France . |
| 2583946 | 12/1986 | France . |
| 2631193 | 11/1989 | France . |
| 8301881 | 5/1983 | World Int. Prop. O. . |
| 8500491 | 1/1985 | World Int. Prop. O. . |

*Primary Examiner*—Tod R. Swann
*Attorney, Agent, or Firm*—Oblon, Spivak, McClelland, Maier & Neustadt

[57] ABSTRACT

In order to scramble as effectively as possible pay-television transmissions, the transmitter is made to transmit, at one and the same time, access messages and entitlement messages, all of them crypted and corresponding to a control word periodically loaded into a pseudo-random generator. In each receiver, the decoder comprises a control unit processing the various messages and sending them to a security processor which supplies a control word to the pseudo-random generator controlling the unscrambling.

8 Claims, 3 Drawing Sheets

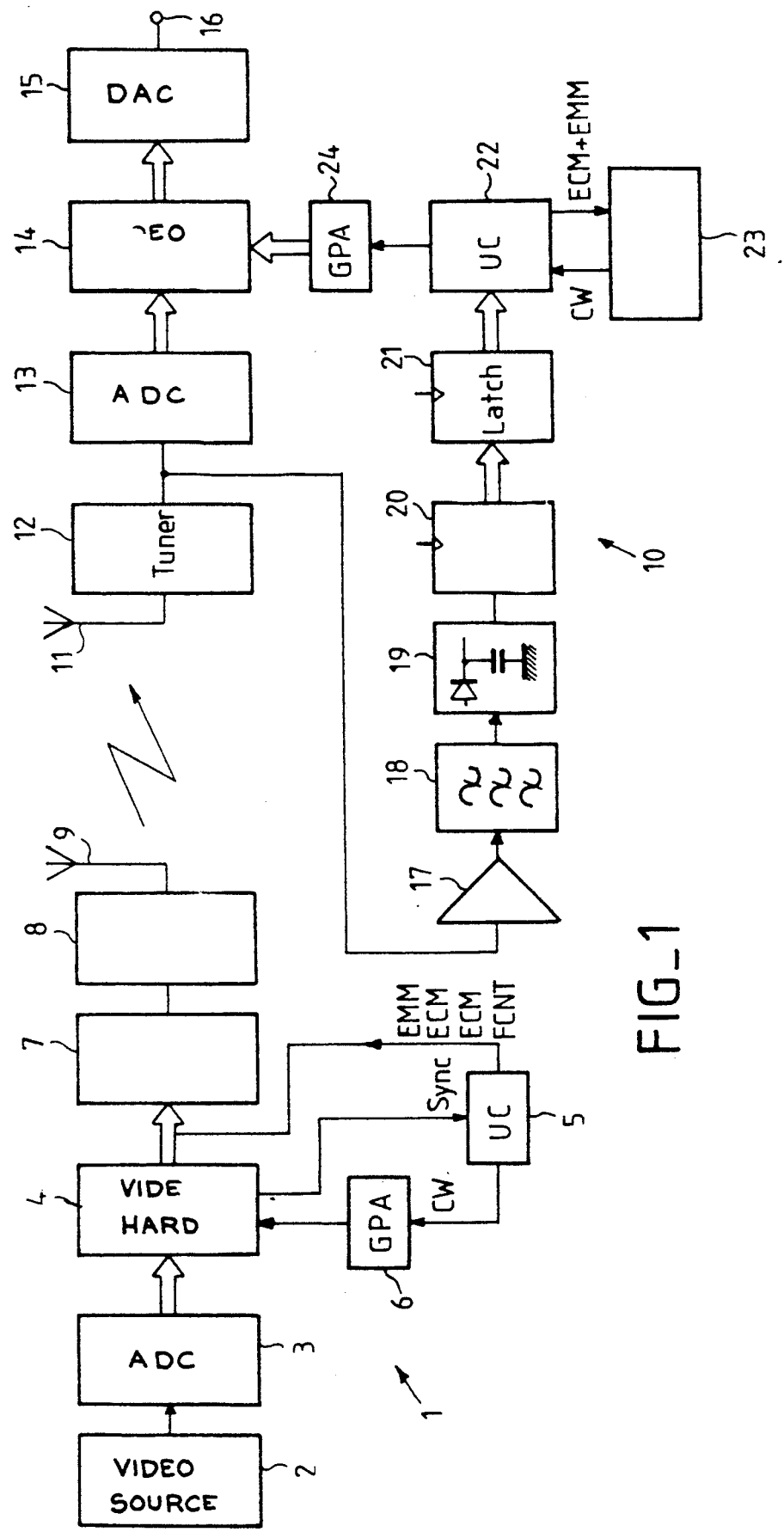
FIG_1

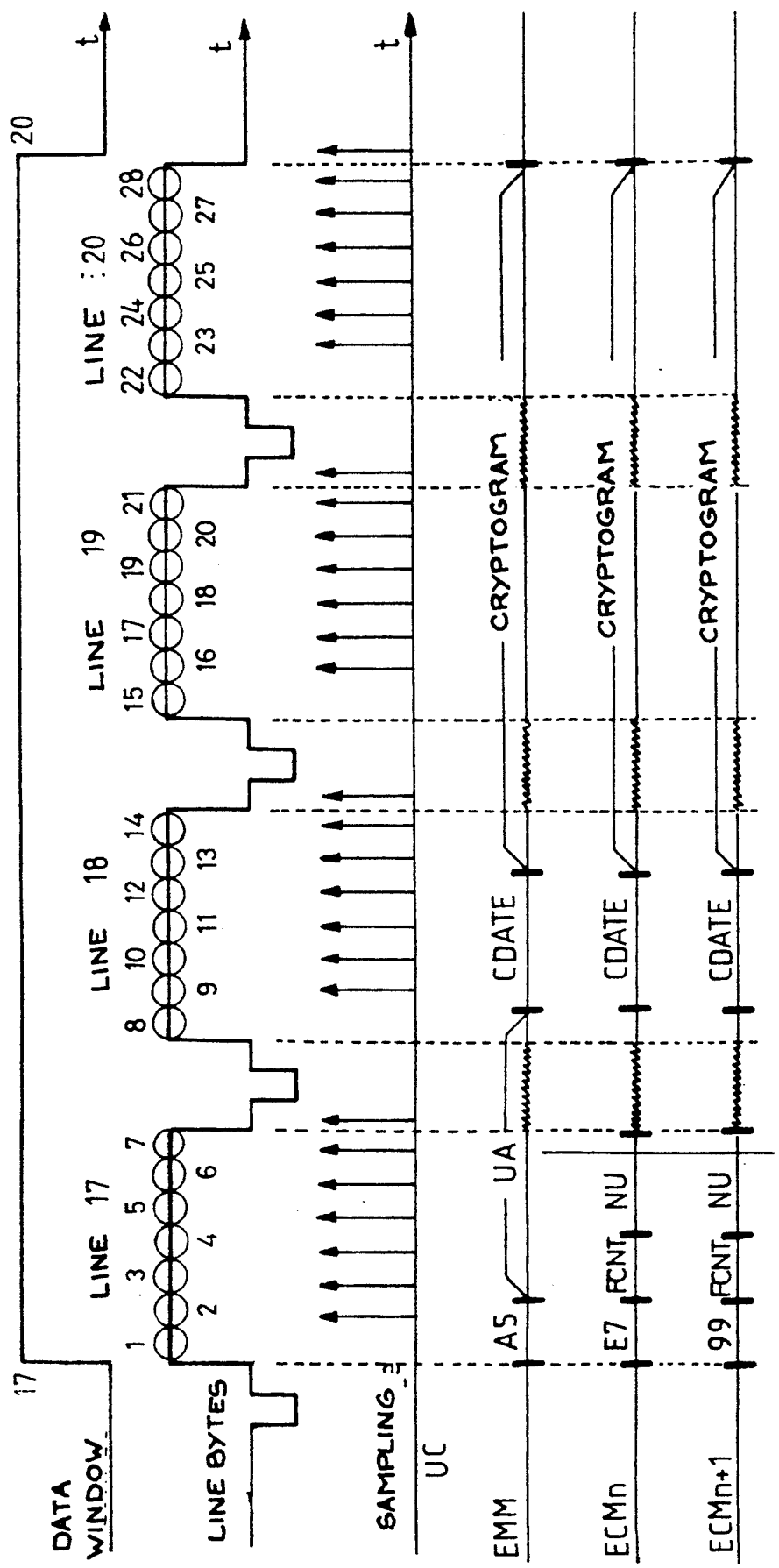
FIG_2

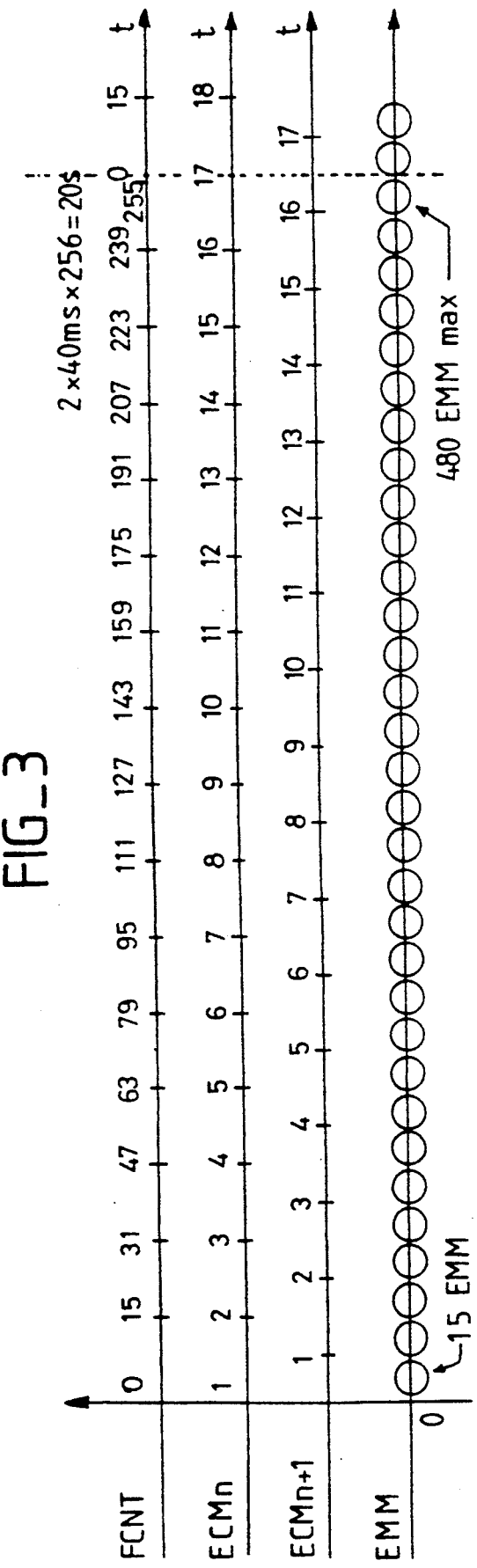
FIG_3
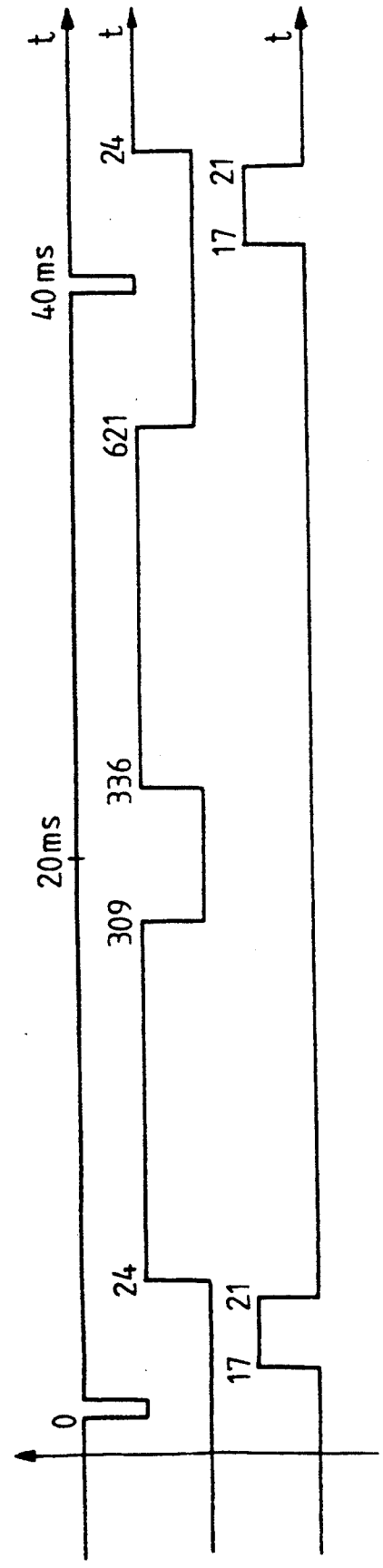
FIG_4

METHOD OF SCRAMBLING AND OF UNSCRAMBLING COMPOSITE VIDEO SIGNALS, AND DEVICE FOR IMPLEMENTATION

The present invention relates to a method of scrambling and of unscrambling composite video signals, and a device for implementation.

The methods currently implemented for scrambling video signals, in particular in the area of pay-television, have the feature of transmitting, on the one hand, access messages valid for all the receivers, simultaneously with the video signals, and, on the other hand, of periodically transmitting entitlement messages specific to each receiver through a different channel, for example through the set or through a telephone channel. Because of their mode of transmission, the periodicity of transmission of these entitlement messages cannot be other than relatively large, for example a month. Such a long period can easily be taken advantage of by "pirates" who thus have sufficient time to discover the scrambling key and to profit therefrom.

The subject of the present invention is a method of scrambling and of unscrambling composite video signals allowing modification of the scrambling key in accordance with a period sufficiently short to practically exclude any possibility of discovering it between two consecutive changes.

The subject of the present invention is also a device for implementing this method.

The method according to the invention consists in including in the unused lines of at least some of the transmitted pictures, data packets corresponding to the entitlement messages and to the access messages.

According to an advantageous aspect of the invention, the data packets also comprise access messages immediately consecutive to those in progress, used when the unscrambler is set going.

Advantageously, one data packet is included at the start of each complete picture.

According to one embodiment of the invention, there is included, at the start of each picture for each period of at least ten or so consecutive pictures, at least one access message for the period in progress, at least one access message for the immediately consecutive period, and for each one of all the other pictures, an entitlement message.

The present invention will be better understood on reading the detailed description of an embodiment, taken as non-limiting example, illustrated by the attached drawing in which:

FIG. 1 is a simplified block diagram of a transmitter of pay-television programmes scrambled according to the method of the invention and of one of the receivers receiving these programmes and comprising a corresponding unscrambling device, FIG. 2 is a signal timing diagram showing the disposition of the various data necessary in the unscrambling in relation to certain of the first few lines of the pictures transmitted by the transmitter of FIG. 1, FIG. 3 is a timing diagram showing the structure of the data packets transmitted by the transmitter of FIG. 1 over a period of 20 seconds, and FIG. 4 is a timing diagram of signals produced, during one complete picture sent by the transmitter of FIG. 1.

The system for broadcasting pay-television programmes which is described below refers to a European broadcasting standard with 25 complete pictures per second, but obviously it can apply to any other standard by making therein modifications apparent to the expert. Furthermore, obviously the transmissions may be scrambled for only certain programmes and be broadcast in the clear for the other programmes.

The transmitter and the television receiver 1 are only briefly described below since the majority of their circuits are well known per se. In the transmitter, only the circuits for producing entitlement and access message packets, and the circuits for inserting these data packets into certain of the lines of the pictures to be scrambled, and in the receiver, the unscrambling circuits, form part of the invention.

The transmitter 1 comprises a picture source furnishing composite video signals. Its output is connected by way of an analog-digital convertor 3 to an intermediate video scrambling circuit 4 of a type known per se. This circuit 4 is controlled by a control unit 5 via a generator 6 of pseudo-random sequences, and it sends to this central unit synchronising signals corresponding to the video signals. The circuit 4 is connected via a digital-analog convertor 7 to a power transmitter 8 whose transmission aerial is referenced 9.

In FIG. 1 has been represented the block diagram of one of the television receivers capable of receiving the transmissions from the transmitter 1 and provided with unscrambling circuits according to the invention. This receiver is referenced 10. The receiver 10 comprises a receiving aerial 11 connected to a tuner 12 followed by an analog-digital convertor 13, by a digital video unscrambling circuit 14, and by a digital-analog convertor 15 at the output 16 of which the unscrambled video signals are collected.

The output of the circuit 12 is also connected, via an amplifier 17, a filter 18 and a peak value detector 19, to the serial input of a shift register 20. The parallel outputs of the register 20 are connected, via a buffer register 21, to the data inputs of a computer with microprocessor 22, for example an EF6805 type microprocessor.

The computer 22 is bidirectionally connected to a security processor, for example a 1821 type processor such as used in "chip cards" (microprocessor card also known by the name "smart card") and bank credit cards. The computer 22 is also connected to a generator 24 of pseudo-random sequences, itself connected to the circuit 14.

In the transmitter 1, the video signals coming from the source 2 and digitised by the convertor 3 are scrambled in the circuit 14 under the control of pseudo-random signal sequences produced by the generator 6. Each of the successive binary numbers of a sequence appearing synchronously with the successive lines of the video signal determines a break point in the corresponding line, this break point being able to be situated at any location whatsoever in the line. The scrambling consists in interchanging the parts of the line which are situated on either side of this break point. This so-called "line interchange" scrambling method being well known per se will not be described in further detail.

The sequences of the pseudo-random generator 6 have a relatively long cycle (for example 20 seconds) and are controlled by the control unit 5 as a function of a programme access message, here called the ECM ("Entitlement Checking Message"), common to all the receivers, and as a function of an entitlement message, here called the EMM ("Entitlement Management Message") specific to each receiver. In the known pay-television systems, the entitlement messages are communicated to the subscribers through the set, through a modem, or through any other telecommunication channel. The access messages can therefore be modified only at relatively long intervals of time (a few weeks in general), which enables "pirates" to discover them (it is estimated that these messages can be discovered in 1 to 2 days), well before their subsequent modification.

According to the present invention, the transmitter 1 includes in the composite video (at the input of the convertor 7) access messages and entitlement messages. Advantageously, it also includes in this composite video at the same time the current access message ($ECM_n$) and the following one ($ECM_{n+1}$). The current message serves to decipher the video signal on switching on the decoder, and the following one to synchronise the decoder, by virtue of the value of the frame counter which, when this value is incremented by one unit on passing from its maximum value (255 in the present case) to zero, controls the loading of the control word (CW) into the pseudo-random generator, in the manner described below.

As the access and entitlement messages are transmitted with the composite video, and because the access messages can be modified at short intervals of time (for example every 20 seconds), it is practically impossible to "pirate" the decoder.

In the transmitter 1, the central unit 5 affords, among other things, a frame counting function (FCNT). This counter is incremented by one unit every two frames, that is to say on each complete picture (every 80 ms for an interlaced frame 50 Hz standard), by virtue of the picture pulses of the video signal which are sent by the circuit 4. In the present case, this counter has a maximum counting state equal to 255 (8-bit counter). After having reached this maximum state, the counter goes back to zero, and this transition to zero controls the sending to the pseudo-random generator 6 of a control word (CW), the encrypted version of which is the said access message. This control word can have, for example, a length of 60 bits, and it is chosen randomly. This control word determines a new cycle of the generator 6.

Furthermore, the control unit 5 sends to the circuit 7 at specified instants, the following information: The state of the counter (FCNT), entitlement messages, the access message in progress and the following one, and the current date. The central unit sends this information during the transmission of lines which are not used by the picture. According to the CCETT 625 line standard, there are lines unused by the visible picture prior to the 23rd line. In the present example, four of these lines which are not taken up by the picture, for example lines 17 to 20, as represented in FIG. 2, are used for the coding. To each of these lines, for the useful duration of the line, the central unit sends seven coding data bytes, namely 56 bits per line and 28 bytes for these four lines. The binary zeros correspond to the black level, and the "1" to the white level. Thus at the start of each complete picture (every 80 ms in the abovementioned example), a data packet (of 28 bytes) is incorporated with the composite video signal transmitted by the transmitter 1.

Three different kinds of data packet are transmitted: EMM, $ECM_n$ and $ECM_{n+1}$. An example of the structure of each of these packet types has been represented in FIG. 2. Advantageously, these data packets are coded, for example with a Hamming code, so as to be best rendered immune to transmission interference.

According to a variant of the invention, the various bytes of each packet can be interlaced within this packet in order to improve the immunity to interference. Obviously, they are firstly correspondingly disinterlaced in each decoder.

In the timing diagram of FIG. 2, the various packets comprise an identifying header. This header, with a length of two bytes, has, for example, the value (in hexadecimal) A5,E7 and 99 for the packets EMM, $ECM_n$ and $ECM_{n+1}$ respectively.

The EMM data packets next comprise six bytes UA for address coding of a particular decoder, which allows coding of $2^{24}$ different decoders, then four bytes for coding the current date, the 16 remaining bytes being available to code the (encrypted) value of the entitlement message.

The coding of the $ECM_n$ packets is of the same form as that of the $ECM_{n+1}$ packets. After the two header bytes, it comprises two bytes giving the value of FCNT. The last three bytes of the first line and the first byte of the following line are unused in the present case. Next, four bytes are reserved for the current date, and the last 16 bytes are available to code the (encrypted) value of the current or following access message.

In FIG. 3 there has been represented, in the first line, a frame counter FCNT counting cycle from 0 to 255, that is to say for a period of time of 20 seconds. during this time, the central unit 5 continuously produces the values of $ECM_n$ and $ECM_{n+1}$ at the rate of sixteen values of each for the said period of 20 seconds. Therefore, during this period of 20 s, 480 values, at most, of EMM are produced.

In the embodiment example represented, the central unit sends, in multiplex, to the input of the circuit 7, the following sequences: 1.$ECM_n$, 15.EMM, 1.$ECM_{n+1}$, 15.EMM, 1$ECM_n$, ... etc. Thus, in each period of 20 seconds (during the 0 to 255 states of FCNT), the central unit incorporates in the composite video signal in total: 16.$ECM_n$, 16$ECM_{n+1}$ and 480EMM. At such a rate, somewhat more than 2 million different EMMs are transmitted by the transmitter 1 in 24 hours.

In each receiver, such as the receiver 10 represented in FIG. 1, the composite signal collected at the output of the circuit 12 is amplified, filtered, demodulated (at 17, 18 and 19 respectively) and the successive data bytes thus demodulated are transmitted to the central unit via the buffer 21. The filling of the shift register 20 occurs at the rate of the clock signals (CK) produced by the central unit 22.

Obviously, the data arriving at the central unit 22 from the register 21 are: EMM, $ECM_n$ and $ECM_{n+1}$. When the central unit 22 recognises the $ECM_n$ or $ECM_{n+1}$ packets (from their header E7 or 99), it extracts therefrom the FCNT value which enables it to correct, if necessary, the count state of its frame counter (subroutines of this central unit). The central unit 22 uses a free wheel to produce FCNT and locks it onto bytes 3 and 4 of the line 17 giving the true current value of FCNT, which is advantageously coded with a Hamming code.

As represented in FIG. 4, the zero state of the frame counter (which returns every 40 ms) determines the phases of processing of the packets by the central unit and of loading of the pseudo-random generator. The active windows of the pseudo-random generator occur during the useful lines of the picture, that is to say, for a 625-line CCETT standard, from lines 23 to 310 and 336 to 623 (for the 1st and 2nd frames of each picture respectively). The central unit 22 produces a standby loop of a duration of about 20 lines at the instant of each transition of FCNT to zero, in order to be in a position to receive the data packets which it receives from the line 17. The data reception window stretches from line 17 to line 21. Beyond this window and almost up to the next zero of FCNT, the central unit is dedicated to processing the data packets.

Having recognised them, the central unit sends the encrypted values of EMM and $ECM_n$, $ECM_{n+1}$, to the processor 23 which processes them in a manner known per se. On the basis of these encrypted values, the processor 23 formulates the control word CW (not encrypted) which it sends to the control unit 22, and the latter loads it into the pseudo-random generator 24 on the transition of FCNT to zero. Thus, this generator 24 is synchronised with the generator 6 of the transmitter. Each value of the pseudo-random sequence furnished by the generator 24 for each line of the picture gives the corresponding value of the break point of this line, which is, obviously, the same as that determined by the generator 6 for the same line.

Because the transmitter frequently (every 20 seconds) sends a large number of values of $ECM_n$ and $ECM_{n+1}$ (16 of each for the example described), the decoder may be able to very rapidly decrypt the received signal (in less than about 3 s).

Because the processing for decoding the video occupies the duration of a line of scanning, the present invention advantageously provides for shifting, on transmission, the chrominance burst relating to a line, towards the following line, which allows an economising of one memory (for example of the "FIFO" type) in each decoder.

On reception, since the processing of the video is done in the current line, it is possible to transmit the synchronising signals and the chrominance burst transparently across a buffer register (the cost of which is markedly less than that of a FIFO type memory for example) and to restore the unscrambled signal corresponding to the abovementioned burst.

By contrast, if the chrominance burst were not transmitted with a delay of one line relative to its corresponding video signal, it would be necessary to use one or two additional memories (depending on whether it is desired to simultaneously read and write the memory or not) in order to shift the synchronising signals and the chrominance burst for as long as the video unscrambling lasts, which would correspondingly increase the cost of the decoder (which is a mass-produced product).

We claim:

1. A device for scrambling and unscrambling composite video pictures in a system comprised of at least one transmitter and a plurality of receivers comprising:
    a scrambling means in at least one said transmitters having,
        a digital scrambling circuit for selectively encrypting frames of said composite video signal;
        a pseudo-random number generator circuit coupled to said digital scrambling circuit;
        control unit means coupled to said pseudo-random number generator circuit;
        means for producing encrypted entitlement messages (EMM) specific to an individual receiver and for producing access messages (ECM) common to all receivers;
        means for inserting said EMM and ECM messages into the transmitted encrypted composite video signal;
        means for sending frame synchronizing pulses with at least some frames of composite video signals;
    unscrambling means in at least some of said receivers having,
        digital unscrambling circuit means coupled to said receiver for unscrambling said received signal;
        pseudo-random number generator means operated in synchronism with the pseudo-random number generator means in a transmitter;
        a free-wheeling counter responsive to the receipt of frame synchronizing pulses from a transmitter; and control unit means coupled to said pseudo-random number generator means, said free-wheeling counter means and said digital unscrambling unit for controlling the operation of said digital unscrambling unit in response to the outputs from said control unit means and said pseudo-random number generator means.

2. A method of scrambling and unscrambling composite video signals comprising the steps of:
    scrambling said composite video signal using a line interchange methodology responsive to a pseudo-random sequence;
    transmitting said composite scrambled signal to a plurality of users;
    unscrambling said scrambled composite signal based upon an identical synchronized pseudo-random as said pseudo-random sequence used for scrambling;
    wherein said pseudo-random sequence is generated in response to a control word (CW) which is encrypted and transmitted with said transmitted composite scrambled signal; and
    wherein packets of encrypted data corresponding to encrypted control words are transmitted in unused lines of at least some of transmitted frames of said composite video signals and wherein said packets further comprise;
        entitlement messages (EMM) specific to a particular user; and
        access messages comprised of current access messages ($ECM_n$) and access messages immediately consecutive with the current messages ($ECM_{n+1}$).

3. A method according to claim 2, characterised in that the number of frames transmitted (FCNT) is counted, and that a new control word is loaded into the pseudo-random generator each time this number reaches a specified value.

4. A method according to claim 2, characterised in that in each data packet the data are interlaced.

5. A method according to claim 2, characterised in that one complete data package is included in each picture.

6. A method according to claim 2, characterised in that the various data packets comprise an identifying part (A5, E7 or 99), a part giving the current date, and a part containing the crypted value of the corresponding message.

7. A method according to claim 2, characterised in that each packet of entitlement messages comprises at least one particular address of a decoder (UA).

8. A method according to claim 2, characterised in that, on transmission, the chrominance burst relating to a line is shifted towards the following line.

* * * * *